Patented Apr. 9, 1940

2,196,575

UNITED STATES PATENT OFFICE 2,196,575

CELLULOSE DERIVATIVE COMPOSITIONS

Shailer L. Bass, Midland, Mich., and Earl G. Hallonquist, Shelton, Wash., assignors to The Dow Chemical Company, Midland, Mich., a corporation of Michigan No Drawing. Application August 4, 1938, Serial No. 222,994

5 Claims. (Cl. 106—40)

This invention relates to compositions of matter comprising solvent-soluble derivatives of cellulose and poly-chlorinated diaryl ethers.

In preparing a plasticized cellulose derivative composition, it is ordinarily the object to provide a composition which is more flexible than the original unplasticized cellulose derivative. Flexibility, however, is not the only desirable attribute of a cellulose derivative composition and the selection of a plasticizer which will modify various other properties of the said cellulose derivative requires considerable care and experimentation. Among the properties of the cellulose derivatives which it may be desirable to modify are those of moisture permeability which should ordinarily be reduced, flexibility which should be increased, tensile strength which should not be decreased materially and if possible should be increased, and for certain purposes the flammability characteristics and dielectric properties should each be modified so as to make the cellulose derivative substantially non-flammable under the conditions of its use and converted to a product satisfactory for use as an electrical insulating medium.

Numerous plasticizers are known which soften cellulose derivatives sufficiently so that they may be employed in the form of flexible foil, sheets, or tape, as wrapping material or the like. Compositions comprising such of the customary plasticizers, for example, as dibutyl phthalate or tricresyl phosphate, are ordinarily not materially better than the cellulose derivative alone as regards moisture permeability, flammability, or dielectric properties. Hence, such compositions cannot be employed satisfactorily as electrical insulating media around wires, cables, and the like, where moisture permeability and flammability of the insulating composition are as important as the flexibility and dielectric properties.

It is accordingly an object of the present invention to provide cellulose derivative compositions comprising plasticizers which will improve the flexibility, reduce the moisture permeability, suppress or overcome the tendency of the cellulose derivative toward flammability and improve the dielectric properties. It is a further object of the invention to provide a cellulose derivative composition comprising a plasticizer which will accomplish the foregoing ends and at the same time increase the tensile strength of the said cellulose derivative when employed under certain hereinafter specified conditions. Other objects of the invention and advantages accruing thereto will become apparent as the description proceeds.

The solvent-soluble derivatives of cellulose with which the invention is concerned are the cellulose ethers, cellulose esters, and nitro-cellulose. The cellulose ethers which we employ according to the hereinafter described invention are the water-insoluble alkyl and aralkyl ethers of cellulose, i. e. those containing from about 2.0 to about 2.75, or higher, substituent groups per anhydro-glucose unit. Examples of such ethers are the water-insoluble ethyl, propyl, butyl, lauryl, and benzyl ethers of cellulose and mixed cellulose ethers comprising a plurality of these substituent groups. The cellulose esters which we may employ include cellulose acetate, cellulose propionate, cellulose butyrate, cellulose acetate-butyrate, cellulose acetate-propionate, and the like. Nitro-cellulose, in its various commercially available viscosity types is also included in the expression "solvent-soluble derivative of cellulose" as employed herein in the description and claims.

We have now found that the aforementioned desirable ends may be attained by incorporating in a solvent-soluble derivative of cellulose from about .01 to about 1.0 part, per part of the cellulose derivative, of a polychloro-diaryl ether. The polychloro-diaryl ethers which we prefer to employ are those comprising from 3 to 7, and preferably from 5 to 6, chlorine atoms substituted in one or more of the aryl nuclei of the said ether. We prefer to use those chlorinated diaryl ethers which are viscous liquids or low-melting solids. When such ethers contain the number of chlorine atoms designated above, they have, in general, flash points in excess of 200° C. and do not support combustion. Specific examples of the chlorinated diaryl ethers which we may employ are the tri-, tetra-, penta-, hexa-, and heptachloro-diphenyloxides and the correspondingly chlorinated phenyl diphenyloxides. The chlorinated phenyl naphthyl and dinaphthyl ethers may be similarly employed. The flash point of these materials is very high and none of them have a fire point or will support combustion. Furthermore, the chlorinated aryl ethers are good solvents for the cellulose derivatives, thus increasing the plastic flow of compositions containing the same, during molding.

We have found that when from 1 to 5 per cent of the aforesaid type of plasticizer is incorporated in a solvent-soluble derivative of cellulose the resulting composition is characterized by its ability to deposit films which have greater tensile strength than the untreated cellulose derivative. These films have slightly improved water-impermeability and considerably better flexibility than do the orignal untreated cellulose derivatives. When from .05 to 1.0, and preferably from .15 to .40 part of plasticizer, per part of cellulose derivative, is incorporated in the composition, there is a substantial reduction of the moisture permeability, an increase in the dielectric strength, and the softened cellulose derivative is much less susceptible to combustion than was the unplasticized compound. In fact, when the solvent-soluble cellulose derivatives are mixed with 15 to 40 per cent of their weight of a polychloro-diaryl ether, foils prepared therefrom fail to support combustion when held horizontally in a flame and then removed. Unplasticized cellulose derivatives and those plasticized with many common plasticizers under like test conditions burn with little difficulty.

We have found that the improved electrical properties of our compositions are retained when the composition is aged, as indicated by exposure tests, either for a period of about one week at 70° C. or for about three weeks exposed during daylight hours to direct sunlight.

The following examples will illustrate the practice of our invention:

EXAMPLE 1

An ethyl cellulose having about 48 per cent ethoxyl content and a viscosity of about 50 centipoises, as determined at 25° C. on a 5 per cent solution thereof in a solvent consisting of 80 parts of toluene and 20 parts of ethanol by volume, was plasticized with 15 and 40 per cent each of penta- and hexachloro-diphenyloxide. The tensile strength and elongation of the resulting compositions, when cast into films, was determined. The results are given in the following table:

Table 1

| Plasticizer | Amount | Tensile strength, kg. per sq. cm. | Elongation, per cent |
|---|---|---|---|
| | Per cent | | |
| Pentachloro-diphenyloxide | 15 | 437 | 15 |
| Do | 40 | 200 | 29 |
| Hexachloro-diphenyloxide | 15 | 530 | 21 |
| Do | 40 | 256 | 25 |
| None | | 481 | 12 |

EXAMPLE 2

Benzyl cellulose containing about 2.5 benzyl groups per molecular unit was tested in a like manner. The results are as follows:

Table 2

| Plasticizer | Amount | Tensile strength, kg. per sq. cm. | Elongation, per cent |
|---|---|---|---|
| | Per cent | | |
| Pentachloro-diphenyloxide | 15 | 269 | 10 |
| Do | 40 | 180 | 43 |
| Hexachloro-diphenyloxide | 15 | 380 | 17 |
| Do | 40 | 220 | 38 |
| None | | 435 | 15 |

EXAMPLE 3

A sample of cellulose acetate-butyrate similarly plasticized gave the following results:

Table 3

| Plasticizer | Amount | Tensile strength, kg. per sq. cm. | Elongation, per cent |
|---|---|---|---|
| | Per cent | | |
| Pentachloro-diphenyloxide | 15 | 570 | 4 |
| Do | 40 | 410 | 4 |
| Hexachloro-diphenyloxide | 15 | 560 | 8 |
| Do | 40 | 510 | 3 |
| None | | 667 | 7 |

EXAMPLE 4

In a like manner cellulose acetate-propionate was plasticized with penta- and hexachloro-diphenyloxides.

Table 4

| Plasticizer | Amount | Tensile strength, kg. per sq. km. | Elongation, per cent |
|---|---|---|---|
| | Per cent | | |
| Pentachloro-diphenyloxide | 15 | 510 | 4 |
| Do | 40 | 405 | 4 |
| Hexachloro-diphenyloxide | 15 | 615 | 6 |
| Do | 40 | 570 | 14 |
| None | | 702 | 8 |

All of the plasticized films of the foregoing four examples failed to support combustion when held horizontally in a flame and removed. They were all somewhat softer than the original unplasticized materials, but as is seen from the tables did not sacrifice too great a proportion of their original tensile strength to make them unsuited to commercial use as wrapping materials and the like. As is to be expected, the lower proportions of plasticizers gave the stronger films.

Following the favorable indications as to plasticity, tensile strength, and elongation obtained from the preliminary experiments reported above, further determinations were made to ascertain the effect of the herein-described plasticizers on the moisture permeability and dielectric properties of various cellulose derivatives. The following tables set forth the results of these tests as regards the use of hexachloro-diphenyl-oxide as the plasticizer. In all experiments where a plasticizer was employed, it was used in an amount equal to 15 per cent of the weight of the particular cellulose derivative.

Table 5

| Run No. | Cellulose derivative | Amount of plasticizer | Percent ethoxyl | Visc., cps. | Moist. perm. gms./m.²/24 hrs. | Effect of aging on film properties | | | | | |
|---|---|---|---|---|---|---|---|---|---|---|---|
| | | | | | | No aging | | 1 week at 70° C. | | 17 day sunlight | |
| | | | | | | T. S. kg./cm.² | Percent elong. | T. S. kg./cm.² | Percent elong. | T. S. kg./cm.² | Percent elong. |
| | | Percent | | | | | | | | | |
| 1 | Ethyl cellulose | 0 | 45.4 | 44 | 1270 | 460 | 4 | 490 | 5 | 480 | 7 |
| 2 | do | 15 | | | 1110 | 460 | 6 | 475 | 6 | 475 | 6 |
| 3 | do | 0 | 47.0 | 15 | 1500 | 440 | 8 | 475 | 10 | 445 | 11 |
| 4 | do | 15 | | | 1030 | 450 | 11 | 450 | 10 | 430 | 11 |
| 5 | do | 0 | 47.8 | 22 | 1560 | 420 | 12 | 490 | 16 | 520 | 25 |
| 6 | do | 15 | | | 890 | 485 | 29 | 490 | 25 | 450 | 21 |
| 7 | do | 0 | 49.4 | 19 | 1320 | 510 | 23 | 520 | 25 | 470 | 23 |
| 8 | do | 15 | | | 870 | 365 | 16 | 460 | 25 | 430 | 23 |
| | | | | | | | | (Three weeks) | | (Three weeks) | |
| 9 | Cellulose acetate | 0 | | | 1720 | 740 | 4 | 800 | 7 | 720 | 5.8 |
| 10 | do | 15 | | | 842 | 710 | 5 | 870 | 4 | 870 | 3 |
| 11 | 6 sec. nitrocellulose | 0 | | | 463 | 760 | 24 | 932 | 10 | 780 | 12.8 |
| 12 | do | 15 | | | 212 | 770 | 22 | 1060 | 15 | 760 | 4 |

By way of contrast with the results obtained on cellulose acetate and 15 per cent of hexa-chloro-diphenyloxide, cf. runs 9 and 10 of the preceding table, a sample of the same cellulose acetate was plasticized with 15 per cent of diphenyloxide itself. The plasticized material had a moisture permeability of 1410 grams per square meter per 24 hours, a tensile strength of only 540 kilograms per square centimeter, and an elongation of 5.8 per cent. From the foregoing Table 5, it is observed that ethyl cellulose of standard ethoxyl content, i. e. from about 45 to 49 per cent, and of any viscosity type is materially improved as to moisture impermeability and is not materially effected as to tensile strength by the incorporation of 15 per cent of hexachloro-diphenyloxide. In some instances, in fact, the tensile strength of the plasticized product is actually higher than that of the original unplasticized material. Similar results are reported in the tables for cellulose acetate and 6-second nitrocellulose. The moisture transmission is much lower than in the unplasticized cellulose derivatives and lower than that of many compositions comprising tricresyl phosphate, dibutyl phthalate, or castor oil as the plasticizer. For under-water service, however, additional water-proofing agents will be required.

Electrical properties of the same compositions as reported in the preceding Table 5 indicate a marked improvement of the plasticized compositions over the original unplasticized cellulose derivatives. The dielectric strength, volts per mil, of representative ethyl cellulose and cellulose acetate samples are reported in Table 6, wherein the run numbers correspond to the compositions of similar number in Table 5.

occurred. A film was cast from the so-formed solution which, when freed from solvent, had a tensile strength of 478 kilograms per square centimeter of original cross section. The ethyl cellulose from which this composition had been prepared could be cast into films having an average tensile strength of only 440 kilograms per square centimeter. The addition of 2 per cent by weight of pentachloro-diphenyloxide resulted in an 8.7 per cent increase in tensile strength.

EXAMPLE 6

A solution of ethyl cellulose, identical with that employed in the preceding example, was treated with 4 per cent by weight of pentachloro-diphenyloxide based on the weight of ethyl cellulose present. Films cast from this solution had an average tensile strength 2.3 per cent greater than that of the untreated ethyl cellulose.

When 6 and 8 per cent, respectively, of pentachloro-diphenyloxide were added to portions of this same ethyl cellulose solution, films and filaments produced therefrom had an average tensile strength 1.3 and 2.3 per cent lower than that of the untreated ethyl cellulose, but had improved electrical properties and were noticeably resistant to combustion.

EXAMPLE 7

An ethyl cellulose capable of forming films, filaments, and the like, having an average tensile strength of 424 kilograms per square centimeter of original cross section was treated with 5 per cent by weight of pentachloro-diphenyloxide. A solvent-free product from the so-treated solution exhibited an average tensile strength of 473 kilograms per square centimeter, representing an Table 6.—Dielectric strength, volts per mil

| Run No. | No aging | | | 1 week at 70° C. | | | 17 days in sun | | | 3 weeks at 70° C. | | | 3 weeks in sun | | |
|---|---|---|---|---|---|---|---|---|---|---|---|---|---|---|---|
| | Aver. of 5 samples | High | Low | Aver. of 5 samples | High | Low | Aver. of 5 samples | High | Low | Aver. of 5 samples | High | Low | Aver. of 5 samples | High | Low |
| 1 | 2700 | 3600 | 2200 | 1700 | 2100 | 1500 | 3200 | 4500 | 2500 | | | | | | |
| 2 | 3000 | 3800 | 2200 | 1800 | 2400 | 900 | 3700 | 5000 | 2100 | | | | | | |
| 9 | 1150 | 1800 | 800 | | | | | | | 680 | 955 | 417 | 443 | 682 | 304 |
| 10 | 1350 | 1500 | 1350 | | | | | | | 1790 | 2000 | 1470 | 880 | 1065 | 687 |

EXAMPLE 5

To 300 grams of a 12 per cent solution of ethyl cellulose in a solvent consisting of 48 parts of benzene, 12 parts of ethanol, and 40 parts of dioxane, by volume, was added 0.72 gram (2 per cent by weight) of pentachloro-diphenyloxide. The mixture was stirred until complete solution increase of 11.5 per cent in the tensile strength.

When 10 per cent of pentachloro-diphenyloxide was added to a solution of this same ethyl cellulose, films cast therefrom had an average tensile strength equal to that of the untreated ethyl cellulose. When 20 per cent of pentachloro-diphenyloxide was incorporated in the ethyl cellulose composition, films and filaments thereof were only 16.5 per cent less strong than the untreated material, and had the improved flexibility, fire-resistance, and dielectric strength which characterize the products reported in Tables 1-6, inclusive.

There does not appear to be any advantage in employing more than about 5 per cent by weight of pentachloro-diphenyloxide as far as its effect of improving the tensile strength of non-fibrous cellulose derivatives is concerned. The higher proportions of plasticizer, i. e. from .05 to 1.0 part per part of cellulose derivative, improve other properties as hereinbefore disclosed. The same in general is true for hexachloro-diphenyloxide, tetrachloro-diphenyloxide, and other polyhalo-diaryl ethers.

The types of ethyl cellulose to which the chlorinated diaryl ethers may be added with advantage are those having ethoxyl contents ranging from about 42 per cent to about 50 per cent. Those with ethoxyl content in the lower portion of this range are adapted to the preparation of molded plastics and the like, while those having from about 48–49 per cent ethoxyl are the ones best adapted to the preparation of transparent films and strong flexible fibers.

The invention has been discussed with reference to the use of the chlorinated diphenyloxides as the plasticizers for cellulose derivatives. The chlorinated phenyl-diphenyloxides and other poly-chlorinated diaryl ethers may be similarly employed, and with similar effect upon tensile strength, flexibility, moisture impermeability, resistance to flammability, and dielectric strength.

The compositions may be employed as electrical insulating wrapping for cables and the like, or in coating compositions where the above-listed improved properties are desirable, especially in the fabrication of relatively non-flammable articles. The compositions may also be used in the extrusion coating of wire. Solid electrical insulators may be made by molding the herein - described compositions into suitable shapes.

Other modes of applying the principle of our invention may be employed instead of those explained, change being made as regards the materials or process employed, provided the ingredients stated by any of the following claims or the equivalent of such stated ingredients be employed.

We therefore particularly point out and distinctly claim as our invention:

1. A composition of matter comprising a cellulose ether containing between about 2.0 and about 2.75 etherifying groups per anhydro-glucose unit, plasticized with between about .01 and about 1.0 part by weight of a polychloro-diaryl oxide containing between about 3 and about 7 chlorine atoms substituted in the aryl nuclei per part of said cellulose ether, to improve the flexibility, reduce the moisture permeability and flammability, and increase the dielectric strength of the said cellulose ether.

2. A composition of matter comprising a cellulose ether and between about .05 and about 1.0 part by weight of a polychloro-diaryloxide containing between about 3 and about 7 chlorine atoms substituted in the aryl nuclei per part of said cellulose derivative, to improve the flexibility, reduce the moisture permeability and flammability, and increase the dielectric strength of the said cellulose derivative.

3. A composition of matter comprising a cellulose ether and between about 15 and about 40 per cent of a polychloro-diaryloxide containing between about 3 and about 7 chlorine atoms substituted in the aryl nuclei based on the weight of said cellulose derivative, to improve the flexibility, reduce the moisture permeability and flammability, and increase the dielectric strength of the said cellulose derivative.

4. A composition of matter comprising ethyl cellulose containing between about 42 and about 50 per cent ethoxyl groups, plasticized with between about .05 and about 1.0 part by weight of a polychloro-diphenyloxide containing between about 3 and about 7 chlorine atoms substituted in the phenyl nuclei, to increase the flexibility, reduce the moisture permeability and the flammability, and increase the dielectric strength of the said ethyl cellulose.

5. A composition of matter comprising ethyl cellulose plasticized with between about 15 and about 40 per cent of hexachloro-diphenyloxide, to increase the flexibility, reduce the moisture permeability and the flammability, and increase the dielectric strength of the said ethyl cellulose.

SHAILER L. BASS.
EARL G. HALLONQUIST.